May 20, 1941.  L. L. WARDEN, SR  2,242,840
PORTABLE WATERING TOWER
Filed July 11, 1940  2 Sheets-Sheet 2
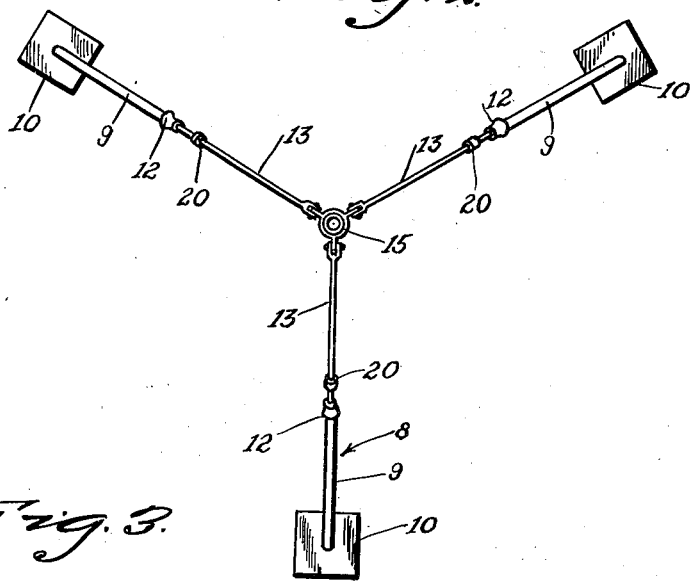
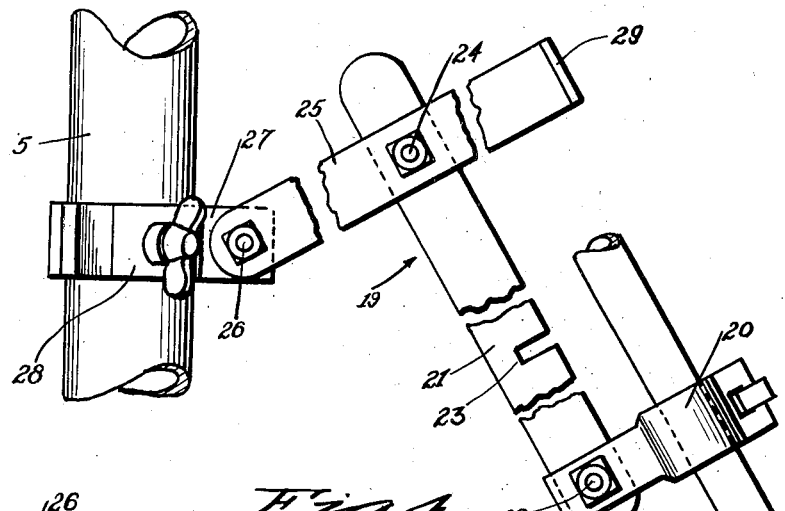
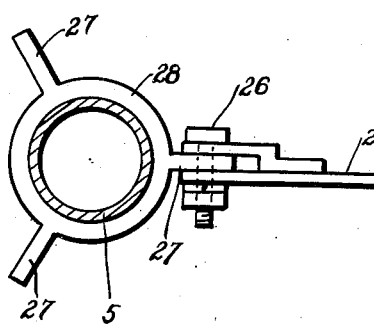
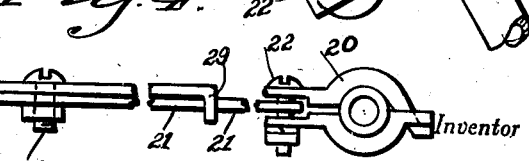
Inventor
Leonard L. Warden Sr.
By Clarence A. O'Brien
Attorney Patented May 20, 1941

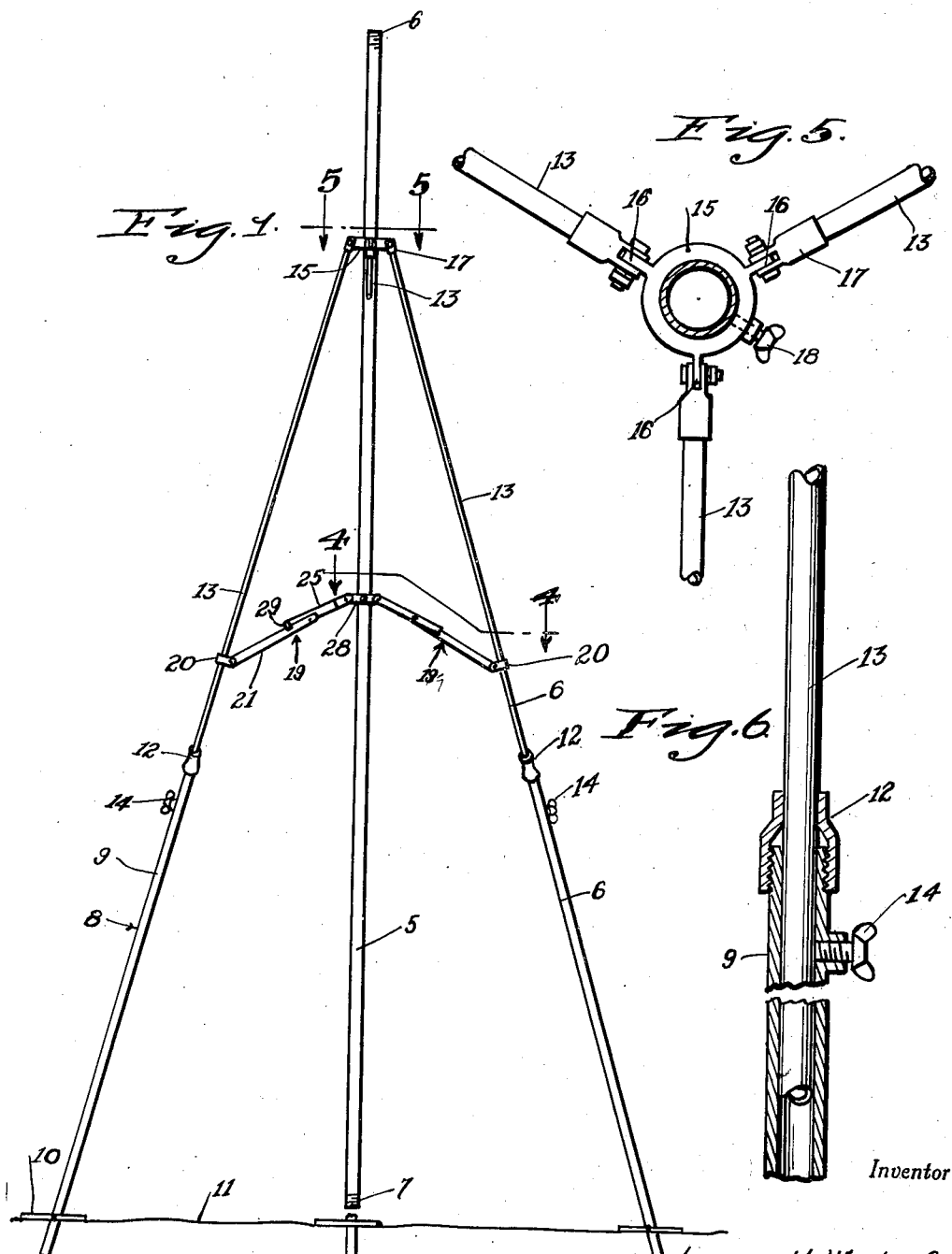

2,242,840

UNITED STATES PATENT OFFICE 2,242,840

PORTABLE WATERING TOWER

Leonard L. Warden, Sr., Pharr, Tex.

Application July 11, 1940, Serial No. 345,006

1 Claim. (Cl. 248—83)

This invention appertains to new and useful improvements in means for watering crops, fruit trees and for other purposes, the principal object being to provide a watering tower for watering crops and fruit trees in a manner simulating natural rains.

Another important object of the invention is to provide a watering tower which can be readily dismantled by folding or assembled by unfolding and which can be readily tapped to irrigation lines of either the portable or permanent type.

Other objects and advantages of the invention will become apparent to the reader of the following specification.

In the drawings:

Figure 1 represents a side elevational view of the tower.

Figure 2 is a top plan view.

Figure 3 is an enlarged fragmentary side elevational view showing one of the spreaders.

Figure 4 is a section on the line 4—4 of Figure 1.

Figure 5 is a section on the line 5—5 of Figure 1.

Figure 6 is a fragmentary sectional view taken substantially on the line 6—6 of Figure 1.

Referring to the drawings wherein like numerals designate like parts, it can be seen in Figure 1, that numeral 5 represents a stand pipe threaded at its upper and lower ends as at numerals 6 and 7. A suitable nozzle or the like can be applied to the upper end 6, while the lower end 7 is tapped to an irrigation line (not shown).

Props 8, preferably three in number, are provided for supporting the stand pipe 5. Each of these props consists of an elongated pipe or tube 9, the lower ends of which extend through base plates 10 and into the ground 11.

The upper ends of these pipes 9 are provided with reducer collars 12 and slidable through these and into the pipes 9 are the smaller pipes 13. Thus the pipes 13 telescope the pipes 9 and set screws 14 are provided on the pipes 9 to hold the pipes 13 in adjusted position.

A collar 15 is provided on the upper portion of the stand pipe 5 and has radially disposed flanges 16 to which are pivotally secured the bifurcated ends of cap members 17 located at the upper ends of the pipes 13. A suitable set screw or the like 18 is provided to secure the collar 15 to the stand pipe 5.

Spreaders generally referred to by numeral 19, each consists of a sectional clamp member 20 for embracing one of the pipe sections 13, certain ends of this clamp 20 being interlocked while the other ends are secured together against one end of a link bar 21 by a bolt 22. This link bar 21 has a notch 23 therein and its other end is pivotally connected by a bolt 24 to an intermediate portion of a second link bar 25, which, in turn, is pivotally connected at one end by a bolt 26 to a laterally disposed flange 27 on a collar 28 which embraces the stand pipe 5. There are three of these flanges 27, one for each of the spreader units 19. The free end of the link bar 25 has a laterally disposed lug 29 which when the links 21 and 25 are aligned fit into the notch 23 of the link 21, as substantially shown in Figures 1 and 4.

Obviously, this tower can be taken down by folding same whenever desired or set up readily by unfolding same and without much effort on the part of workmen.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A watering tower comprising a vertically disposed water supply attachable stand pipe, an upper collar on the pipe, a lower collar on the pipe, a plurality of props each consisting of upper and lower telescopic sections, the upper sections being pivotally secured to the upper collar, breakable brace connections between the lower collar and the upper prop sections, detent means between the sections of each prop and a ground engaging plate on the lower portions of the lower sections of the props.

LEONARD L. WARDEN, Sr.